(12) United States Patent
Russell et al.

(10) Patent No.: US 11,063,929 B2
(45) Date of Patent: Jul. 13, 2021

(54) BODY AREA NETWORK FOR AUTHENTICATION AND SERVICE PROVISION

(71) Applicant: Motorola Mobility LLC, Chicago, IL (US)

(72) Inventors: Michael Edward Russell, Lake Zurich, IL (US); Amitkumar N. Balar, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 165 days.

(21) Appl. No.: 15/612,517

(22) Filed: Jun. 2, 2017

(65) Prior Publication Data

US 2018/0352439 A1    Dec. 6, 2018

(51) Int. Cl.
| | |
|---|---|
| *H04L 29/06* | (2006.01) |
| *H04W 12/00* | (2021.01) |
| *H04W 8/00* | (2009.01) |
| *H04W 12/47* | (2021.01) |
| *H04W 12/06* | (2021.01) |
| *H04W 12/084* | (2021.01) |
| *H04W 48/16* | (2009.01) |
| *H04L 29/08* | (2006.01) |
| *H04W 4/80* | (2018.01) |

(52) U.S. Cl.
CPC ........ *H04L 63/083* (2013.01); *H04L 63/0853* (2013.01); *H04L 63/0861* (2013.01); *H04W 8/005* (2013.01); *H04W 12/009* (2019.01); *H04W 12/068* (2021.01); *H04W 12/084* (2021.01); *H04W 12/47* (2021.01); *H04L 67/02* (2013.01); *H04L 67/12* (2013.01); *H04L 67/20* (2013.01); *H04L 2463/082* (2013.01); *H04W 4/80* (2018.02); *H04W 48/16* (2013.01)

(58) Field of Classification Search
CPC ...... H04W 12/08; H04W 48/16; H04L 12/28; H04L 63/083
USPC .......................................................... 726/4
See application file for complete search history.

(56) References Cited

U.S. PATENT DOCUMENTS

2015/0181430 A1    6/2015 Lee
2015/0372770 A1*  12/2015 Ouzounov ........... H04B 13/005
                                                    455/41.2
(Continued)

OTHER PUBLICATIONS

"IEEE Standard for Local and metropolitan area networks—Part 15.6: Wireless Body Area Networks", IEEE Std 802.15.6™-2012, Feb. 29, 2012, 271 pages.
(Continued)

*Primary Examiner* — Evans Desrosiers
(74) *Attorney, Agent, or Firm* — FIG. 1 Patents (57) ABSTRACT

A computing device detects a trigger or context associated with exchanging, using a body area network (BAN), body area network services with another device. The BAN services can include a discovery service to allow the computing device to connect to a network. Responsive to detecting the trigger or context, one or more body area networks are discovered and the other device is discovered. If the computing device and the other device are new to each other, the computing device is authenticated to the body area network one or more body area network services can be exchanged. If the devices are not new to each other, body area network services can be exchanged using the other device.

20 Claims, 6 Drawing Sheets

(56) References Cited

U.S. PATENT DOCUMENTS

2016/0174071 A1* 6/2016 Weast ............... H04W 12/50
455/411
2016/0381012 A1* 12/2016 Sydir ............... H04B 13/005
726/7
2017/0111123 A1 4/2017 Ouzounov

OTHER PUBLICATIONS

Baldus,"Human-Centric Connectivity Enabled by Body-Coupled Communications", IEEE Communications Magazine • Jun. 2009, Jun. 2009, pp. 172-178.
Cornelius,"On Usable Authentication for Wireless Body Area Networks", In USENIX Workshop on Health Security (HealthSec), Position paper, Aug. 2010, 2 pages.
Dobrican,"A Context-Aware Collaborative Mobile Application for Silencing the Smartphone during Meetings or Important Events", International Journal on Advances in Intelligent Systems, 2016, 10 pages.
Li,"Group Device Pairing based Secure Sensor Association and Key Management for Body Area Networks", INFOCOM'10 Proceedings of the 29th conference on Information communications, Mar. 2010, 9 pages.
Shi,"BANA: Body Area Network Authentication Exploiting Channel Characteristics", IEEE Journal on Selected Areas in Communications ( vol. 31, Issue: 9, Apr. 2012, 12 pages.
Toorani,"On Vulnerabilities of the Security Association in the IEEE 802.15.6 Standard", Financial Cryptography and Data Security, LNCS 8976, Jan. 12, 2015, 18 pages.
Venkatasubramanian,"PSKA: Usable and Secure Key Agreement Scheme for Body Area Networks", IEEE Transactions on Information Technology in Biomedicine, vol. 14, No. 1, Jan. 2010, 9 pages.

* cited by examiner

BODY AREA NETWORK FOR AUTHENTICATION AND SERVICE PROVISION

BACKGROUND

Currently, to unlock an electronic device, an application needs to be started, a password or passcode needs to be entered, or a physical key needs to be inserted. Similarly, to associate two electronic devices wirelessly, a discovery process and authentication/authorization process is required which can discover many other devices in the process and be susceptible to man-in-the-middle attacks. Moreover, authenticating a user to a particular website or third-party application often involves a number of manual steps which can be tedious and time-consuming. One such authentication procedure is a 2-step authentication procedure in which a user physically enters their password at the website and receives, from the website, an authentication code. The user is then required to physically enter the authentication code in order to proceed with the website.

BRIEF DESCRIPTION OF THE DRAWINGS

Embodiments for body area network authentication and service provision are described with reference to the following Figures. The same numbers may be used throughout to reference like features and components that are shown in the Figures.

DETAILED DESCRIPTION

Overview

Various embodiments provide a consumer electronic device configured to establish a body area network with other devices. When so established, the body area network can facilitate service exchange with other devices including personal computing devices, servers including third party servers, devices associated with third-party service providers, and the like. The service exchange can be used for, among other things, network discovery, authentication services, authorization services, exchanging service information between consumer electronic devices and the like. Such can facilitate further operations for applications or other wireless links not maintained by the body communication channel associated with the body area network. For example, the techniques described herein can be used to unlock devices, such as computing devices, phones, cars, door locks, and the like. The techniques can also facilitate discovery and pairing of devices, such as smart watches and phones, phones and access points, phones and vending machines, phones and laptops, and the like. While features and concepts for body area network for authentication and service provision can be implemented in any number of different devices, systems, environments, and/or configurations, embodiments for body area network for authentication and service provision are described in the context of the following example devices, systems, and methods.

Example Operating Environment

Figure 1:
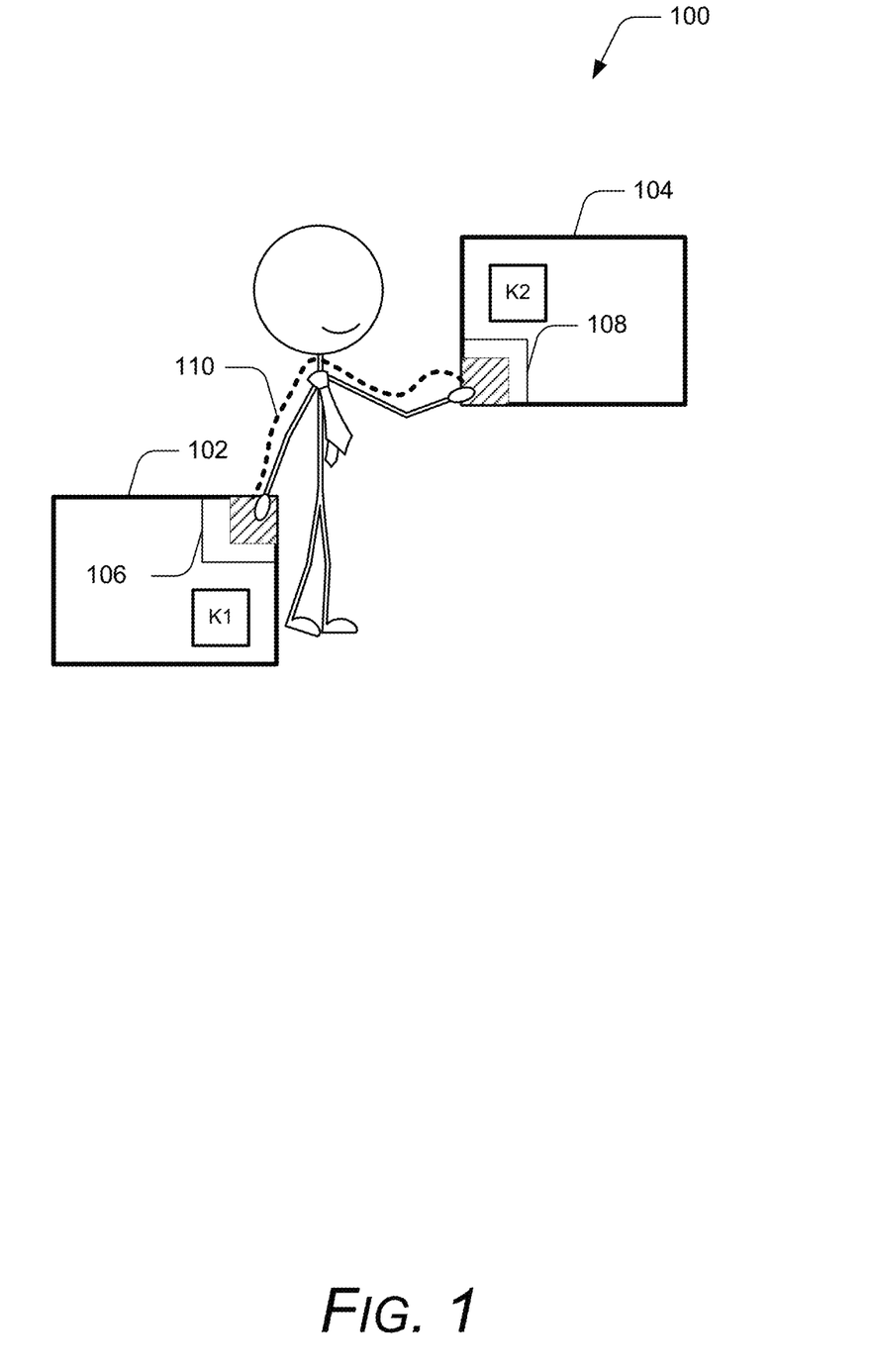
FIG. 1 illustrates an example operating environment in accordance with one or more embodiments.

FIG. 1 illustrates principles an example body-coupled communication system 100 that communicates over a body area network (BAN). The body coupled communication system 100 includes a first device 102 and a second device 104. The first device 102 includes a body coupled communication interface 106 and the second device 104 comprises a body coupled communication interface 108 for forming a body area network via a body transmission channel 110 following or through a body of a user when the body coupled communication interfaces 106, 108 are in the direct vicinity or physically touching the body of the user. The body coupled communication interface 106 and the body coupled communication interface 108 communicate information with each other via the body transmission channel 110. The direct vicinity is defined as a maximum distance at which, respectively, the first device 102 and the second device 104 are capable of transmitting and/or receiving information via the body transmission channel 110. The maximum distance is a distance between the body of the user and, respectively, the body coupled communication interface 106 and the body coupled communication interface 108.

In some instances, at least one of the first device 102 and the second device 104 comprises a mechanism (i.e., keys K1, K2) which is configured to provide additional security to a user of the body coupled communication system 100 to prevent misuse of the first device 102 or the second device 104.

In one or more embodiments, the body coupled communication interface 106 and/or the body coupled communication interface 108 may each include an electrode (illustrated as the cross-hatched rectangle) or an antenna. When the user touches the electrode on each device, information may be transmitted via the body of the user because a capacitive, direct or ohmic contact with the body is obtained. However, in at least some instances, to communicate information via the body of the user it is not necessary that the user touches the electrode on each device. That is, if the body is in the direct vicinity, for example, within 10 cm from the corresponding electrodes, communication may be possible via capacitively coupled signals. When the user does not have to touch the electrode, the term "antenna" is more appropriate. In some instances, the distance between the body of the user and the respective body coupled communication interfaces 106, 108 may be smaller than 5 cm before communication via the body of the user and the respective body coupled communication interfaces 106, 108 is possible.

Detecting that the user has touched the respective body coupled communication interfaces 106, 108, or that the user is in the direct vicinity of the respective body coupled communication interfaces 106, 108 may be performed by measuring sudden changes in specific characteristics of the electrodes (appearing in cross-hatched form), or by detecting, with a body-sensing element, the presence of the body of the user. Thus, the body of the user is the physical medium along or within which signals are communicated. In various embodiments, different protocols may be used to transmit information along this physical medium and different protocols may be used to access this medium with different devices (for example, time division multiplexing, or, alternatively, frequency division multiplexing, etc.).

In the illustrated and described embodiment, the body coupled communication interface 106 and the body communication interface 108 are configured to form the body area network. This basically means that the physical communication is performed via the body transmission channel 110 and that the respective body coupled communication interfaces 106, 108 apply a network protocol to the communication between the devices. In particular, when more than two devices are present in the body area network, an addressing scheme may be used to send information to the correct device. Such a network protocol may comprise a "light weight" option for the situation that only two devices are present in the body area network. Such a "light weight" option may omit an addressing scheme when the total number of devices present in the body area network is smaller than three. The capability of the respective body coupled communication interfaces to form a network may also include a discovery protocol to detect whether new active devices with a body coupled communication interface are located close to the body of the user such that they may become a new member of the body area network. The respective devices 102, 104 or the respective body coupled communication interfaces 106, 108 may transmit a beacon signal when they are in the direct vicinity of the body of the user. The beacon signal indicates the presence of the device and may include information related to how to contact the device which had transmitted the beacon signal. The respective devices 102, 104 or the respective body coupled communication interfaces 106, 108 may be configured to detect such beacon signals and reply to the beacons signal with a request to set up a body area network.

In at least some embodiments, each key K1, K2 is stored in a key storage. The keys K1, K2 are used to securely communicate information between the first device 102 and the second device 104 via the body area network. In operation, in at least some embodiments, the first device 102 and the second device 104 encrypt information to be transmitted with the respective keys K1, K2 and decrypt received information with the respective keys K1, K2. Thus, each one of the first device and second device is configured to apply an encryption/decryption scheme to the information to be transmitted via the body area network. The encryption/decryption scheme may define that symmetrical or asymmetrical keys K1, K2 are used and/or the encryption/decryption scheme may define that one of the keys K1, K2 is a public key, while the other one of the keys K1, K2 is a private key. It is to be noted that the respective key storages may be non-volatile memory which may be programmed with the value of the respective keys K1, K2. The key storage may also be a piece of hardware which has the values of the respective keys permanently fixed in its internal design.

Figure 2:
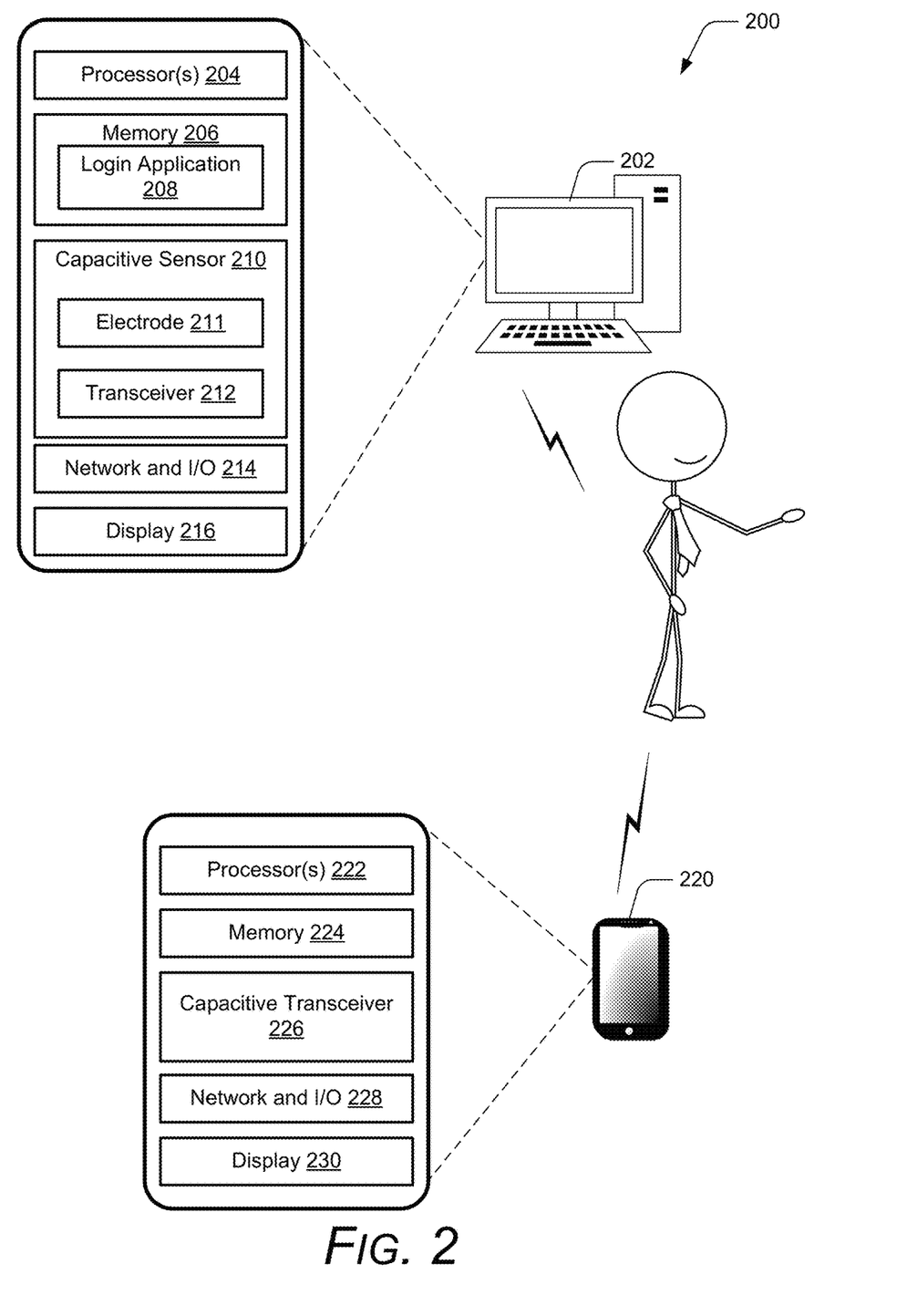
FIG. 2 illustrates the example operating environment of FIG. 1 in accordance with one or more embodiments.

FIG. 2 illustrates, in somewhat more detail, an example body-coupled communication system 200 that communicates over a body area network (BAN) in accordance with one or more embodiments.

System 200 includes a user device 202 having one or more computer processors 204, a memory 206 which may store a login application 208, a capacitive sensor 210 including an electrode 211 and a transceiver 212, network and input/output (I/O) interfaces 214, and a display 216 in communication with each other. The system 200 may also be configured to facilitate communication between the user device 202 and one or more personal mobile devices 220 by using the user as a medium for the communication. The personal mobile device 220 may include one or more computer processors 222, a memory 224, a capacitive transceiver 226, network and input/output (I/O) interfaces 228, and a display 230 in communication with each other. It will be appreciated that all transceivers, receivers, transmitters, and/or the like described with respect to the user device 202 and the personal mobile device(s) 220 may be configured to receive and/or transmit any type of radio signals (e.g., Body Area Network (BAN) signals, WiFi radio signals, Bluetooth radio signals, Bluetooth Low-Energy radio signals, etc.). It is to be appreciated and understood that the functionality described with respect to mobile device 220 can also be implemented, at least in part, through a modular attachment that attaches to the mobile device 220.

The processors 204/222 may comprise one or more cores and may be configured to access and execute (at least in part) computer-readable instructions stored in the memory 206/224. The processors 204/222 may include, without limitation: a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user devices 202, 220 may also include a chipset (not shown) for controlling communications between the processors 204/222 and one or more of the other components of the user devices. The processors 204/222 may also include one or more application-specific integrated circuits (ASICs) or application-specific standard products (ASSPs) for handling specific data processing functions or tasks.

The memory 206/224 may include one or more computer-readable storage media. In some embodiments, the memory 206/224 may include non-transitory media such as random access memory (RAM), flash RAM, magnetic media, optical media, solid-state media, and so forth. The memory 206/224 may be volatile (in that information is retained while providing power) or non-volatile (in that information is retained without providing power). Additional embodiments may also be provided as a computer program product including a transitory machine-readable signal (in compressed or uncompressed form). Examples of machine-readable signals include, but are not limited to, signals carried by the Internet or other networks. For example, distribution of software via the Internet may include a transitory machine-readable signal. Additionally, the memory 206/224 may store an operating system that includes computer-executable instructions that may be implemented by the processor 204/222 to perform a variety of tasks to operate the interface(s) and any other hardware installed on the user device. The memory 206/224 may also store content that may be displayed by the user device 202 or transferred to other devices (e.g., headphones) to be displayed or played by the other devices. The memory 206/224 may also store content received from the other devices. The content from the other devices may be displayed, played, or used by the user device to perform any necessary tasks or operations that may be implemented by the processor 204/222 or other components in the user device 202/personal mobile device 220.

The network and I/O interfaces 214/228 may also include one or more communication interfaces or network interface devices to provide for the transfer of data between the user device 202 and another device (e.g., network server) via a network (not shown). The communication interfaces may include, but are not limited to: body area networks (BANs), personal area networks (PANs), wired local area networks (LANs), wireless local area networks (WLANs), wireless wide area networks (WWANs), and so forth. The user device 202 may be coupled to the network via a wired connection. However, the wireless system interfaces may include the hardware and software to broadcast and receive messages either using the Wi-Fi Direct Standard and/or the IEEE 802.11 wireless standard, the Bluetooth standard, or any other wireless standard and/or a combination thereof. The wireless system (not shown) may include a transmitter and a receiver or a transceiver capable of operating in a broad range of operating frequencies governed by the IEEE 802.11 wireless standards. The communication interfaces may utilize acoustic, radio frequency, optical, or other signals to exchange data between the user device 202 and another device such as an access point, a host computer, a server, a router, a reader device, and the like. The network may include, but is not limited to, the Internet, a private network, a virtual private network, a wireless wide area network, a local area network, a metropolitan area network, a telephone network, and so forth.

The display 216/230 may include, but is not limited to, a liquid crystal display, a light-emitting diode display, or an E-Ink display as made by E Ink Corp. of Cambridge, Mass. The display may be used to show content to a user in the form of text, images, or video. In certain instances, the display may also operate as a touch screen display that may enable the user to initiate commands or operations by touching the screen using certain finger or hand gestures.

In one or more instances, a user may wish to securely log into an operating system stored in a memory 206 of a user device 202. The user device 202 may include a capacitive sensor 210, which may include an electrode 211 and a transceiver 212. The capacitive sensor 210 may be externally coupled to the user device 202, or alternatively, the capacitive sensor 210 may be integrated on the user device 202. For instance, the capacitive sensor 210 may be integrated into all and/or a portion of the display 216 (e.g., behind the display 216). As another example, the capacitive sensor 210 may be integrated into the frame and/or chassis of the user device 202.

In addition, the user may be coupled to a personal mobile device 220, which may include a capacitive transceiver 226. In certain embodiments, the personal mobile device 220 may be touching the user 218. For instance, the personal mobile device 220 may be a smartphone, a personal digital assistant, a tablet and/or the like that is held by the user. In other implementations, the personal mobile device 220 may be a wearable item or accessory including, but not limited to, a watch, a necklace, a headband, a bracelet, a pin, a badge, a belt, or a ring. To this end, the capacitive transceiver 226 may be composed of any capacitive and/or flexible material that may be shaped and/or otherwise contoured to a user's body.

According to one or more embodiments, the capacitive sensor 210 on the user device 202 may be configured to determine, detect, and/or otherwise receive a touch interaction from the user. The touch interaction may include a finger press, a swipe gesture, and/or any other type of touch event. To this end, the touch interaction may indicate that the user wishes to log into the operating system of the user device 202. As the user touches the capacitive sensor 210, the electrode 211 detects a change in capacitance of the capacitive sensor 210. Upon determining the capacitance change by the electrode 211, the transceiver 212 is configured to transmit an indication or request for the user's credential information. The indication or request may be transmitted via the user's body to the personal mobile device 220. In certain embodiments, the indication or request may be transmitted through the user's body using a first communications channel at approximately 125 KHz. However, it will be appreciated that any other frequency for the first communications channel is possible. Additionally, in certain embodiments, upon detecting the capacitance change, the capacitive sensor 210 may transmit a signal to the processor(s) 204 that causes the processor(s) 204 to switch the user device 202 from a first power state to a second power state. For example, the user device 202 may initially be in a sleep state or other lower power state. Upon detecting the capacitance change due to the touch interaction by the user, the user device 202 may "wake-up" and switch to full power and/or a relatively higher power state.

Furthermore, as previously discussed, the personal mobile device 220 may be coupled to, attached to, and/or otherwise in contact with the user's body. As such, the capacitive transceiver 226 on the personal mobile device 220 may be configured to receive the indication or request from the transceiver 212 on the user device 202. In some implementations, the indication or request may include a device identifier associated with the user device 202. The device identifier may include any type of data that identifies the user device 202 such as a media access control (MAC) address and/or the like. Upon receipt of the indication or request, the capacitive transceiver 226 may be configured to identify credential information associated with the user. Additionally, the credential information may be transmitted through the user's body to the capacitive sensor 210 on the user device 202. Such credential information may be stored in memory 224 and/or any other storage location in communication with the personal mobile device 220. In some implementations, the credential information may include login information to log in to the operating system of the user device 202. For example, the credential information may include data associated with a user identifier, a user password, biometric data of the user, encryption information, and/or the like. In certain implementations, the credential information may be determined based at least in part on the device identifier received in the initial indication or request. As such, the personal mobile device 220 (e.g., the capacitive transceiver 226) may determine the appropriate credential information based on the device identifier associated with the user device 202.

In certain embodiments, the credential information may be transmitted via the user's body using a second communications channel at approximately 8 Mhz. However, it will be appreciated that any other frequencies for the second communications channel are also contemplated and that the first communications channel and the second communications channel may also operate at the same frequency. While the user may be still touching and/or otherwise in contact with the capacitive sensor 210, the capacitive sensor 210 may be configured to receive the credential information via the user's body and the second communications channel. To this end, the capacitive sensor 210 may be configured to transmit and/or otherwise provide the credential information to the login application 208. The login application 208 may be configured to log in to the operating system using the credential information. In some implementations, the login application 208 may be included as part of the operating system of the user device 202.

As illustrated by FIG. 2 and described above, the system 200 may facilitate communication between the user device 202 and the personal mobile device 220 through the establishment of a BAN through the user's body. The system 200 may further enable the user to log in to the operating system of the user device 202 by simply touching a capacitive sensor 210 coupled to the user device 202 while also in contact with the personal mobile device 220 (e.g., and/or the capacitive transceiver 226). As such, the user may avoid having to remember multiple credential information (e.g., login information such as user identifiers and passwords). Furthermore, since the login procedure may be automated upon a user's touch interaction, the user 218 may also avoid manually inputting the credential information. Moreover, since the credential information may be transmitted via the user's body, the credential information may be transmitted in a relatively secure manner compared with wireless transmission through the air.

Having considered an example embodiment of a body area network, consider now various embodiments for third-party authentications, authorizations, and other services.

Exchanging Body Area Network Services

Figure 3:
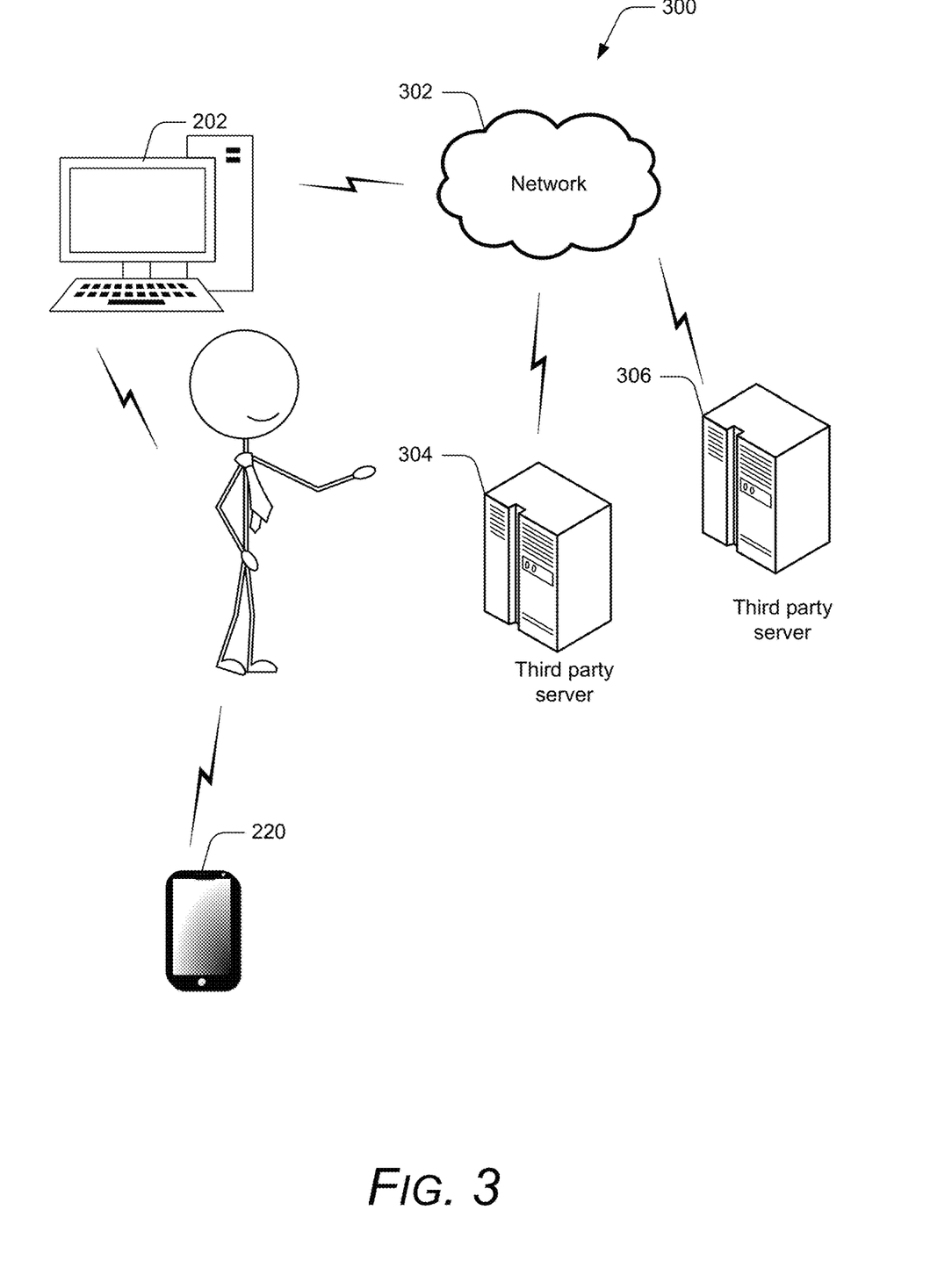
FIG. 3 illustrates another example operating environment in accordance with one or more embodiments.

FIG. 3 illustrates an example body-coupled communication system 300 that communicates over a body area network (BAN) in accordance with one or more embodiments.

System 300 includes a user device 202 and one or more personal mobile devices 220 as described above in connection with FIG. 2. The system 300 also includes a network 302 and multiple third-party servers, examples of which are shown at 304, 306. Network 302 can comprise any suitable type of wired or wireless network that can be accessed using any suitable type of communication protocol. In at least some embodiments, network 302 includes the Internet over which so-called "BAN services" can be consumed by a user of devices 202, 220. BAN services can constitute any suitable type of service that can be consumed by a user of devices 202, 220 including, by way of example and not limitation, authentication services (e.g., Bluetooth, Wifi, passwords, log ins, device unlocking), authorization services (e.g., payment, 2-step authentication), exchange services (e.g., business cards, service handovers), and the like.

The embodiments described just below employ the use of so-called "triggers" and context to ascertain whether a body area network is available and, if so, use the body area network over a body-coupled communication channel to implement various functionality including consuming services provided by third-party servers 304, 306. The triggers that are employed can comprise any suitable type of trigger that can initiate exchange of BAN services with third-party servers 304, 306. Examples of triggers include, by way of example and not limitation, motion triggers such as a device being picked up or moved, putting on a watch, moving a mouse, and the like. Device context can include, by way of example and not limitation, an "out-of-box-experience" such as when a new device is initially unpackaged or turned on for the first time, re-pairing a device with another device with which it has previously been paired, and the like. The triggers and context permit a body area network to be discovered and for BAN services to be exchanged, often at least in part automatically, without requiring user interaction.

Consider now an example method in which BAN services can be exchanged.

Figure 4:
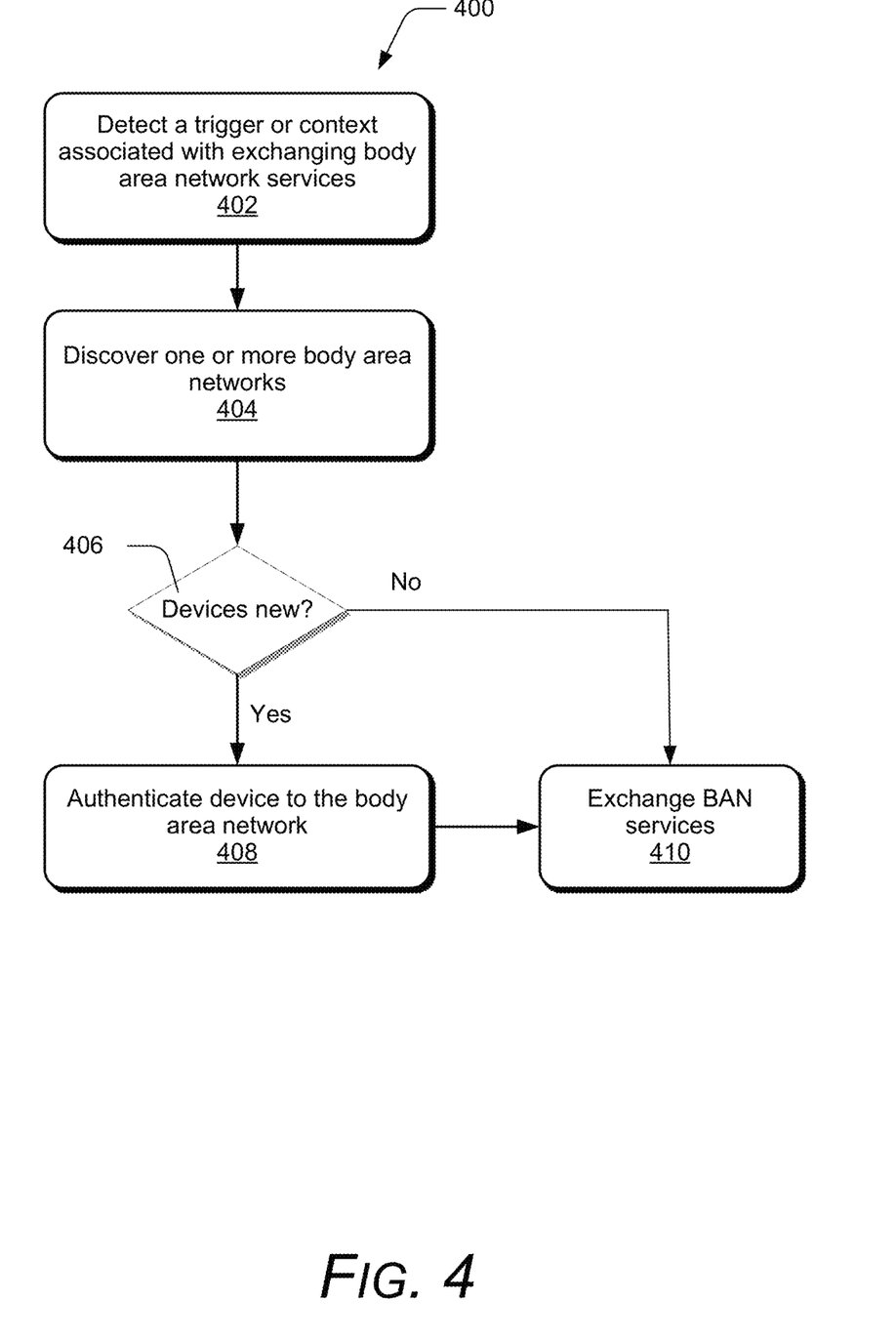
FIG. 4 is a flow diagram that describes operations in accordance with one or more embodiments.

FIG. 4 illustrates an example method 400 in which BAN services can be exchanged, in accordance with one or more embodiments. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternately or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (AS SPs), System-on-a-chip systems (SoCs), Complex Programmable Logic Devices (CPLDs), and the like. The order in which the method is described is not intended to be construed as a limitation, and any number or combination of the described method operations can be performed in any order to perform a method, or an alternate method.

At 402, a trigger or context associated with exchanging body area network (BAN) services is detected. The body area network services can be exchanged with other computing devices such as a user's computing device, a server, a third-party, such as a third-party server or any other suitable third party computing device that is different from any of the computing devices that make up the body area network. Any suitable trigger or context can be utilized. For example, as noted above, the trigger can be a motion trigger in which a device is moved and sensors on the device sense that it has been moved. Such can occur when a device is picked up or otherwise relocated. Alternately or additionally, a device context can include a new device being turned on for the first time. Other triggers and contexts can be employed without departing from the spirit and scope of the claimed subject matter. At 404, one or more body area networks are discovered. This operation can be performed in any suitable way. For example, a new device or a device such as a phone or watch can poll for other devices that might be on the body area network. So, for example, if a user picks up their mobile phone after a stationary period, the mobile phone may begin a polling period to attempt to locate other devices on the body area network. Having found at least one device, at 406 a determination is made as to whether the devices are new to each other. In this case, a device can be new to another device if it has not yet been authenticated to the device and/or the body area network.

If the devices are new to each other (i.e. the "yes" branch), at 408 the device that has not been authenticated to the body area network (i.e. the mobile phone in this example) is authenticated to the body area network and the method proceeds to 410 in which BAN services can be exchanged. Authentication can take place in any suitable way including, by way of example and not limitation, as described in IEEE 802.15.6. If, on the other hand, the devices are not new to each other (i.e. the "no" branch), the method proceeds to 410 in which BAN services can be exchanged.

In the illustrated and described embodiment, exchanging BAN services can include one or more of authentication services, authorization services, or information exchange services as described above and below. For example, exchanging BAN services can include automatically connecting to a suitable network, such as network 302 (FIG. 3), over which services can be exchanged. Network 302 can comprise any suitable network including, by way of example and not limitation, a Bluetooth network, Wi-Fi network or any other suitable wireless or wired network. In some instances, connecting to the network so that services can be exchanged enables the user to forgo any sort of network discovery process on, in this example, their mobile phone. This can, in turn, enable the user to avoid time-consuming manual steps such as navigating through a list of devices through which a Bluetooth network can be accessed, selecting the correct device, entering a suitable pin number, and the like. In the illustrated and described embodiment, the mobile device can avoid the Bluetooth band and, instead, go through the body area network in order to establish a connection so that BAN services can be exchanged. Accordingly, the mobile phone can perform a Bluetooth discovery and authentication using the body area network which allows discovery and authentication out of band from the Bluetooth network.

As noted above, BAN services can comprise any suitable type of services that can be exchanged over a body area network. Such services can include, by way of example and not limitation, authentication services, authorization services, exchange services and the like. As examples of the above services, consider the following use cases which illustrate the flexibility and efficiency with which services may be exchanged.

Figure 5:
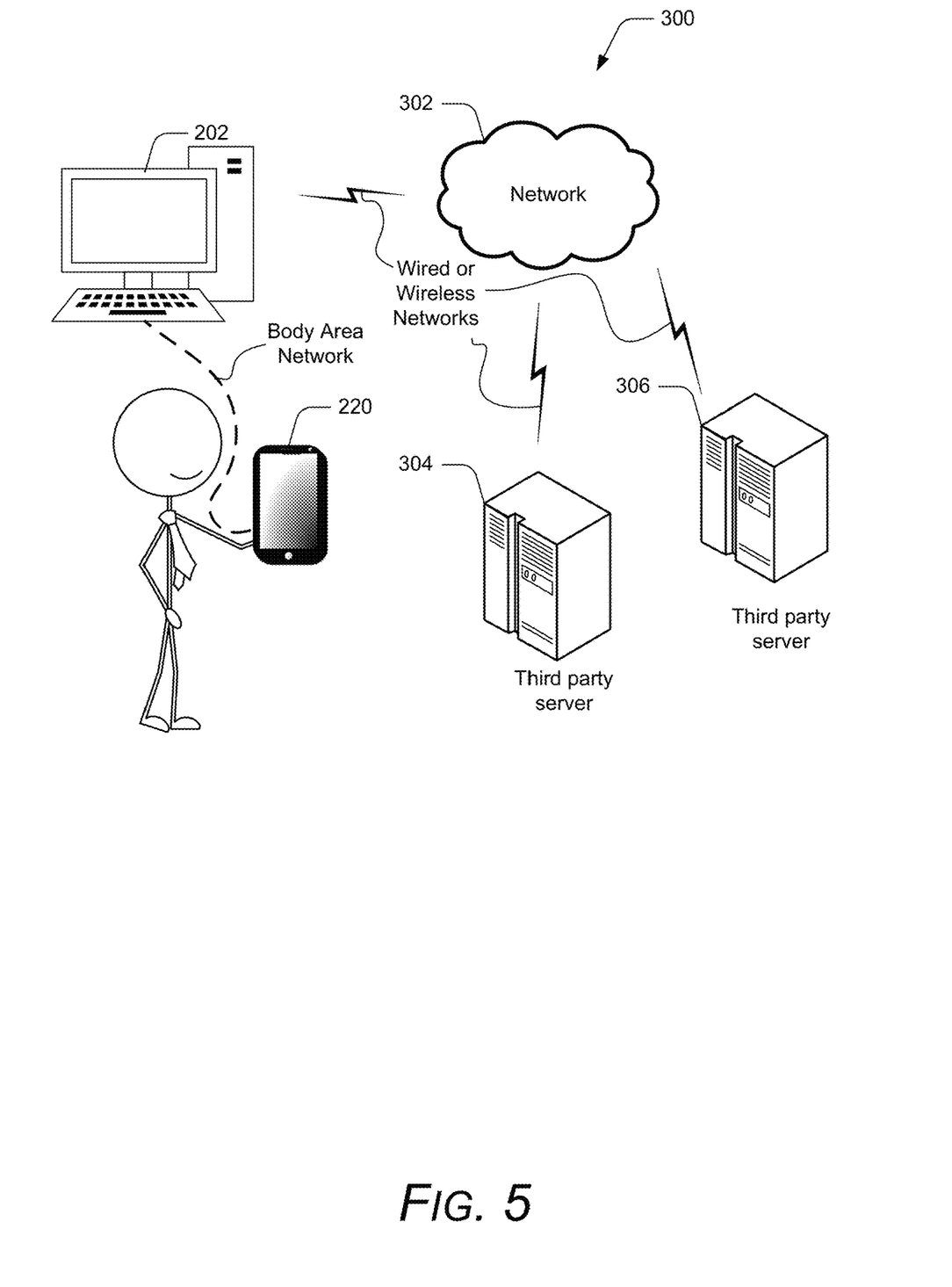
FIG. 5 illustrates the operating environment of FIG. 3 in which a body area network can be utilized to access third-party services in accordance with one or more embodiments.

To begin with, FIG. 5 illustrates the system of FIG. 3 at 300 in a slightly different way. First, a dashed line indicates a portion of a body area network established between the devices 202 and 220. This body area network permits device 220 to be authenticated to device 202 and/or the body area network as described above. Information can now be exchanged between device 220 and 202 including, by way of example and not limitation, information that can permit BAN services to be exchanged over wireless networks or links that are not maintained by the body communication channel that supports the body area network. As noted above, exchanged services can include authentication services, authorizing services, exchange services and the like.

As a first use case, consider the situation where a user uses their device 220 unlock the device 202 using the body area network. An example of how this can be done is described above. Once the user has unlocked the device 202 and completed any authentication procedures relative to device 202, the user can use the body area network to login to various websites and/or otherwise interact with applications not maintained by device 202, such as web applications and the like. This can include automatically providing information to permit authentication to take place with these various websites, applications and the like. This can include automatically providing passwords, login information, 2-step authentication information and the like, from device 220 to the website by way of the body area network and one or more wireless networks (as illustrated) that do not include the body area network. For example, 2-step authentication or verification typically involves signing into an account using a password as is normally done. After signing into the account, a code is typically sent to the user's phone via text, voice call, or a mobile application. This code is then entered at the website or application to complete the 2-step authentication or verification. In the present example, the user is relieved of having to manually enter any such information because such information can be provided automatically over the body area network from device 220 to device 202, and then on to the website by way of one or more wired or wireless networks. Specifically, when device 220 is communicatively linked with device 202, the user can use device 202 to access a website. At the login for the website, device 220 can automatically convey the user's password or any other suitable credentials to device 202 by way of the body area network. The password or credentials can be automatically entered and used to log into the website. Now, when device 220 receives a code as part of its 2-step authentication or verification, this code can be automatically provided from device 220 to device 202 and entered into the appropriate field to complete the 2-step authentication and verification.

In at least some embodiments, once the user is not in physical contact with either or both devices, or at least in close proximity, the connection between the devices is lost and the user can take no further action with respect to the website. This process can also be used to pass an RSA token from device 220 through the body area network to device 202.

In another use case, a wearable device, such as a watch, may be unlocked using a PIN or fingerprint, and other electronic devices on the body area network can be unlocked through touch while the watch is worn. Once unlocked in this manner, BAN services can be exchanged. For example, a user may proceed to a website, such as a financial website, where the user can authorize payment. The user can authenticate or verify at the financial website using the body area network and information included or otherwise stored on the wearable watch. As long as a connection—either physical or near-proximity connection—is maintained between the watch and the device 202, the user may proceed to transact their financial business. As soon as the connection between the watch and the device 202 is lost, they will be unable to transact their financial business.

As another use case example, a user may power up a new device for the first time. This new device can include, by way of example and not limitation, a wrist-worn watch. The user may hold their cellular phone in their other hand in order to establish a body area network. By doing so, a Bluetooth discovery process and pairing can happen automatically over the body area network, as described above. The Bluetooth connection and pairing can be used as a basis to enable services, including third-party services to be exchanged.

The various embodiments described above can mitigate the possibility of eavesdropping or man-in-the-middle attacks that can occur when devices are separated and communicate over a wireless network through the air. That is, the body area network and body-coupled communications behave much like the wire and stop working if the connection is broken i.e. the two devices are not being touched or are not in close proximity to the user. The user's experience is enhanced because instead of having to manually perform a number of steps such as to pair devices, consume third-party services, and the like, pairing and third-party service consumption can take place automatically using, at least in part, the body area network established between the two devices by way of the user.

Having considered an example method and use cases in accordance with one or more embodiments, consider now an example computing device that can implement the embodiments described above. The computing device about to be described can be used to implement any of the computing devices described in this document.

Example Device

Figure 6:
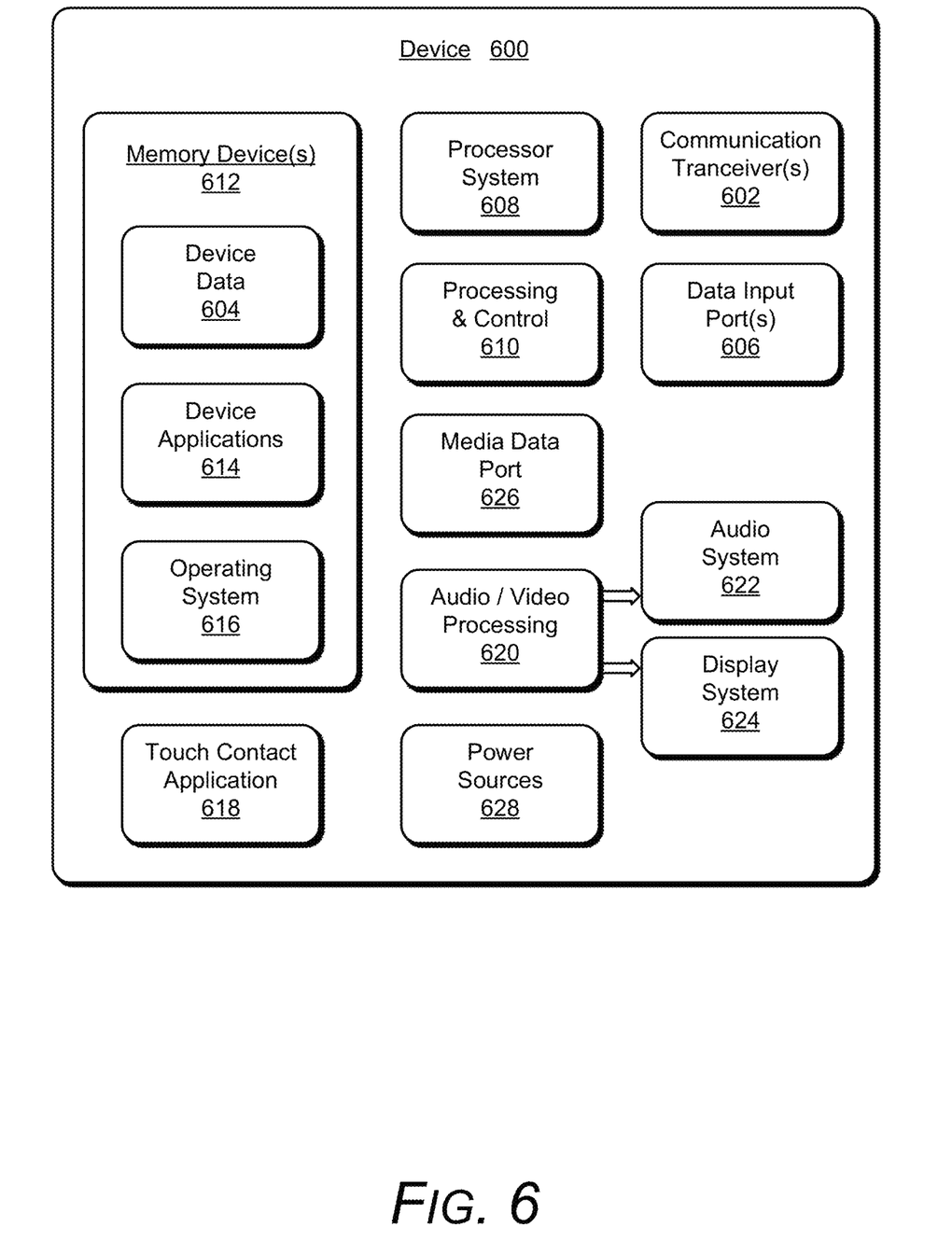
FIG. 6 illustrates various components of an example device that can implement various embodiments.

FIG. 6 illustrates various components of an example device 600 in which body area network authentication and service provision embodiments can be implemented. The example device 600 can be implemented as any suitable type of computing device, such as any type of client device, mobile phone, tablet, computing, communication, entertainment, gaming, media playback, watch, and/or other type of device. For example, the device 120 shown in FIG. 1 may be implemented as the example device 600.

The device 600 includes communication transceivers 602 that enable wired and/or wireless communication of device data 604 with other devices. Additionally, the device data can include any type of audio, video, and/or image data. Example transceivers include BAN transceivers, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication. BAN transceivers can be disposed on the device itself, or a device peripheral such as a mouse, keyboard, or stylus, connected through either a wired or wireless connection.

The device 600 may also include one or more data input ports 606 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 600 includes a processing system 608 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device can be implemented with any one or combination of software, hardware, firmware, or fixed logic circuitry that is implemented in connection with processing and control circuits, which are generally identified at 610. The device 600 may further include any type of a system bus or other data and command transfer system that couples the various components within the device. A system bus can include any one or combination of different bus structures and architectures, as well as control and data lines.

The device 600 also includes computer-readable storage memory or memory devices 612 that enable data storage, such as data storage devices that can be accessed by a computing device, and that provide persistent storage of data and executable instructions (e.g., software applications, programs, functions, and the like). Examples of the computer-readable storage memory 612 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 600 may also include a mass storage media device.

The computer-readable storage memory provides data storage mechanisms to store the device data 604, other types of information and/or data, and various device applications 614 (e.g., software applications). For example, an operating system 616 can be maintained as software instructions with a memory device and executed by the processing system 608. The device applications may also include a device manager, such as any form of a control application, software application, signal-processing and control module, code that is native to a particular device, a hardware abstraction layer for a particular device, and so on. In this example, the device 600 includes a touch contact application 618.

The device 600 also includes an audio and/or video processing system 620 that generates audio data for an audio system 622 and/or generates display data for a display system 624. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 626. In implementations, the audio system and/or the display system are integrated components of the example device. Alternatively, the audio system and/or the display system are external, peripheral components to the example device.

The device 600 can also include one or more power sources 628, such as when the device is implemented as a mobile device. The power sources may include a charging and/or power system, and can be implemented as a flexible strip battery, a rechargeable battery, a charged super-capacitor, and/or any other type of active or passive power source.

CONCLUSION

Various embodiments provide a consumer electronic device that is configured to establish a body area network with other devices. When so established, the body area network can facilitate service exchange with other devices, including devices associated with third-party service providers. The service exchange can be used for, among other things, authentication services, authorization services, exchanging service information between consumer electronic devices and the like. Such can facilitate further operations for applications or other wired or wireless links not maintained by the body communication channel associated with the body area network.

Although body area networks for authentication and service provision have been described in language specific to features and/or methods, the subject of the appended claims is not necessarily limited to the specific features or methods described. Rather, the specific features and methods are disclosed as example implementations, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for using a body area network, the method comprising:
   detecting, by a computing device using the body area network (BAN), a trigger or context associated with utilizing body area network services, including an authentication service, the trigger being a motion trigger that indicates movement of an additional device to add as a member of the BAN;
   determining whether the additional device has previously been authenticated to the computing device or to the BAN;

responsive to the determining that the additional device has not previously been authenticated to the computing device or to the BAN, the body area network services providing authentication information to permit authentication of the additional device to the BAN, the authentication information permitting two-step authentication; and responsive to the determining that the additional device has previously been authenticated to the computing device or to the BAN, providing the authentication information from the computing device to the additional device over the BAN effective to enable authorizations using the BAN.

2. The method as recited in claim 1, wherein the motion trigger initiates exchange of one or more of the body area network services.

3. The method as recited in claim 1, wherein the context comprises the computing device being turned on.

4. The method as recited in claim 1, wherein the additional device comprises a watch, and the motion trigger is associated with the movement of the watch being put on by a user.

5. The method as recited in claim 1, wherein the context comprises re-pairing the computing device with the additional device with which it was previously paired.

6. The method as recited in claim 1, wherein the detecting the additional device is performed by the computing device polling for other devices.

7. The method as recited in claim 1, further comprising exchanging the body area network services by the computing device utilizing the authentication service.

8. The method as recited in claim 7, wherein the exchanging the body area network services includes the computing device utilizing an authorization service to authorize data communication by the additional device on the BAN.

9. The method as recited in claim 1, wherein the body area network services include a discovery service utilized by the computing device to connect to a Wi-Fi network.

10. The method as recited in claim 9, wherein the discovery service of the body area network services provides for automatically connecting to the Wi-Fi network using the body area network.

11. A computing device comprising:
a communication interface to communicate data via a body transmission channel of a body area network (BAN);
one or more processors to implement body area network services, including a discovery service and an authentication service to perform operations comprising to:
discover a device to add as a member of the BAN utilizing the discovery service;
determine whether the discovered device has previously been authenticated to the computing device or to the BAN;
responsive to the determination that the discovered device has not previously been authenticated to the computing device or to the BAN, authenticate the discovered device to the BAN utilizing the authentication service;
responsive to the determination that the discovered device has previously been authenticated to the computing device or to the BAN, provide authentication information from the computing device to the discovered device over the BAN effective to enable authorizations using the BAN; and
the body area network services providing the authentication information to permit authentication of the discovered device with a third-party website, the authentication information permitting two-step authentication.

12. The computing device as recited in claim 11, wherein the body area network services automatically provide the authentication information to permit authentication of the discovered device with the third-party website.

13. The computing device as recited in claim 11, wherein the body area network services provide for interaction by the computing device with a financial website as long as a connection is maintained via the BAN between the computing device and the discovered device.

14. The computing device as recited in claim 11, wherein the operations comprise to detect a trigger associated with utilizing the body area network services, the trigger comprises a motion trigger that indicates movement of the discovered device.

15. The computing device as recited in claim 11, wherein the discovery service is utilized by the computing device to automatically connect to a Wi-Fi network using the body area network.

16. The computing device as recited in claim 11, wherein the body area network services facilitate interaction by the computing device with a web application not maintained by the discovered device that is authenticated to the BAN.

17. One or more non-transitory computer-readable media storing computer readable instructions which, when executed, perform operations comprising:
detecting, by a computing device using a body area network (BAN), a trigger or context associated with utilizing body area network services with a third-party device that is different from any computing device making up the body area network;
utilizing, by the computing device, a discovery service of the body area network services to automatically connect to a Wi-Fi network using the BAN;
responsive to detecting the trigger or the context, discovering a device to add as a member of the BAN;
determining whether the discovered device has previously been authenticated to the computing device or to the BAN;
responsive to the determining that the discovered device has not previously been authenticated to the computing device or to the BAN, the body area network services providing authentication information to permit authentication of the discovered device to the BAN, the authentication information permitting two-step authentication; and
responsive to the determining that the discovered device has previously been authenticated to the computing device or to the BAN, exchanging the body area network services with the third-party device that automatically provides the authentication information from the computing device to the discovered device over the BAN effective to enable authorizations using the BAN.

18. The one or more non-transitory computer-readable media as recited in claim 17, wherein the trigger is a motion trigger that indicates movement of the discovered device and initiates exchange of one or more of the body area network services.

19. The one or more non-transitory computer-readable media as recited in claim 17, wherein the body area network services provide for interaction by the computing device with a web application not maintained by the discovered device.

20. The one or more non-transitory computer-readable media as recited in claim 17, wherein the discovered device comprises a watch, and the trigger is associated with movement of the watch being put on by a user.

* * * * *